US009598266B2

(12) United States Patent
Valkama et al.

(10) Patent No.: US 9,598,266 B2
(45) Date of Patent: Mar. 21, 2017

(54) APPARATUS FOR ALIGNMENT OF AN ELEVATOR GUIDE RAIL

(71) Applicants: Peetu Valkama, Pinsio (FI); Harri Mäkinen, Tampere (FI); Osmo Björni, Hyvinkaa (FI)

(72) Inventors: Peetu Valkama, Pinsio (FI); Harri Mäkinen, Tampere (FI); Osmo Björni, Hyvinkaa (FI)

(73) Assignee: KONE CORPORATION, Helsinki (FI)

( * ) Notice: Subject to any disclaimer, the term of this patent is extended or adjusted under 35 U.S.C. 154(b) by 127 days.

(21) Appl. No.: 14/515,903

(22) Filed: Oct. 16, 2014

(65) Prior Publication Data

US 2015/0128403 A1 May 14, 2015

(30) Foreign Application Priority Data

Nov. 14, 2013 (EP) .................................... 13192859

(51) Int. Cl.
*B66B 19/00* (2006.01)
*B66B 7/02* (2006.01)
(Continued)

(52) U.S. Cl.
CPC .......... *B66B 19/002* (2013.01); *B66B 5/0087* (2013.01); *Y10T 29/49895* (2015.01); *Y10T 29/53983* (2015.01)

(58) Field of Classification Search
CPC ....... B66B 7/021; B66B 7/024; B66B 19/002; B66B 5/0087; B66B 7/026; B23P 19/10
(Continued)

(56) References Cited

U.S. PATENT DOCUMENTS 1,957,630 A * 5/1934 Frederick .................. B66B 7/02 187/408
3,330,021 A * 7/1967 Jacobsen ............ B23K 37/0531 228/44.5
(Continued)

FOREIGN PATENT DOCUMENTS

CH 561659 A5 * 5/1975 ............... B66B 7/02
GB 2076321 A * 12/1981 ....... H01L 21/67138
(Continued)

OTHER PUBLICATIONS

European Search Report dated Apr. 11, 2014 issued in corresponding European Application No. 13192859.

*Primary Examiner* — William A Rivera
*Assistant Examiner* — Stefan Kruer
(74) *Attorney, Agent, or Firm* — Harness, Dickey & Pierce, P.L.C.

(57) ABSTRACT

Example embodiments relate to an apparatus including a stationary first part, a movable second part, and a link arm mechanism connecting the first part and the second part. The first and the second link arm may be interconnected with a fifth articulated joint. First ends of the link arms may be connected with articulated joints movably on the first part. Second ends of the link arms may be connected with articulated joints on the second part. The second part may be moved with a first actuator in a first direction, with a second actuator in a third direction and with a third actuator in a fourth angular direction around the fourth articulated joint.

11 Claims, 5 Drawing Sheets

Figure 1:
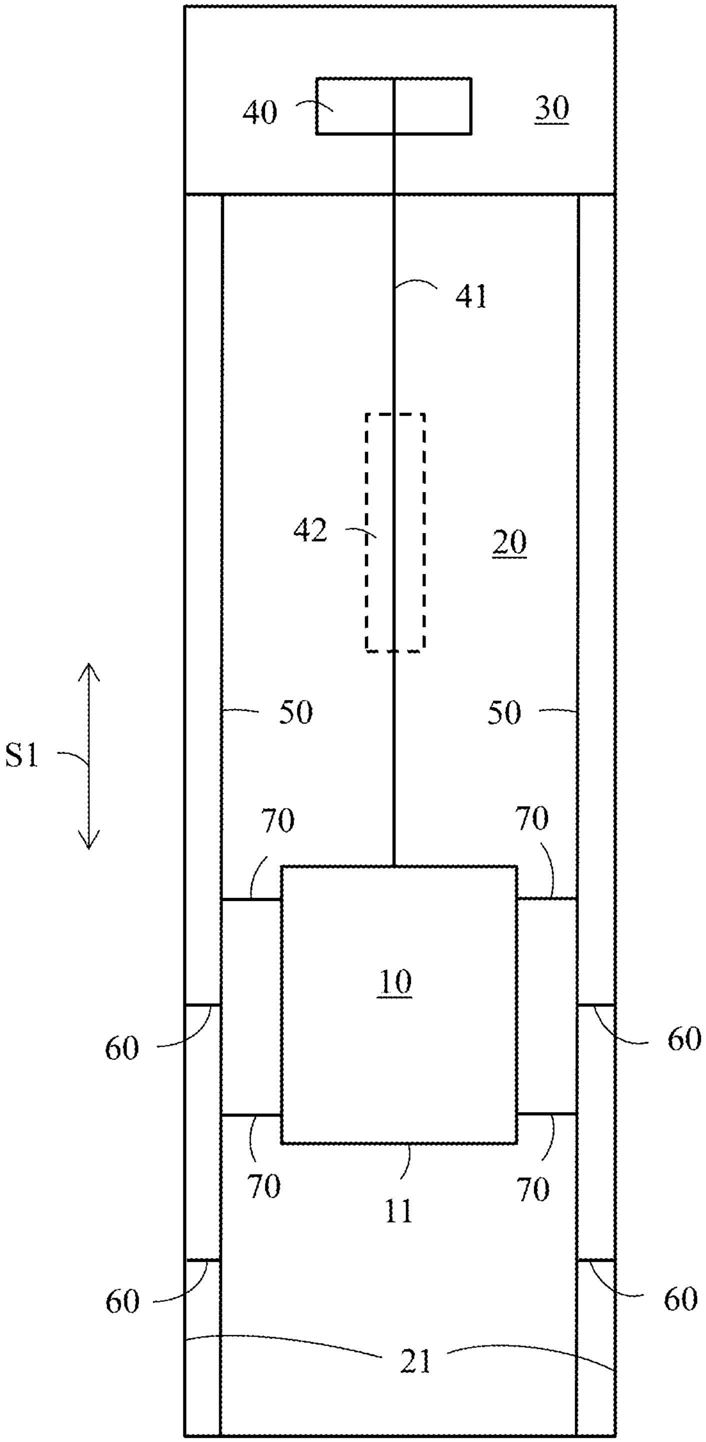

(51) Int. Cl.
*B23P 19/10* (2006.01)
*B66B 5/00* (2006.01)

(58) Field of Classification Search
USPC ....... 187/408, 900; 52/745.2, 741.1; 29/428, 29/429, 464, 467, 468, 409.09; 269/56, 269/60, 76, 79, 81, 281.6
IPC ........................................................ B23P 19/10
See application file for complete search history.

(56) References Cited

U.S. PATENT DOCUMENTS

| | | | | | |
|---|---|---|---|---|---|
| 4,577,729 | A * | 3/1986 | Karol | B66B 7/024 | 187/408 |
| 2009/0065310 | A1 * | 3/2009 | Flynn | B66B 19/002 | 187/408 |
| 2009/0120734 | A1 * | 5/2009 | Barneman | B66B 19/002 | 187/408 |
| 2009/0266651 | A1 * | 10/2009 | Van Der Meijden | B66B 19/00 | 187/408 |
| 2012/0312640 | A1 | 12/2012 | Bjorni et al. | | |
| 2015/0217972 | A1 * | 8/2015 | Hawkins | G01C 15/10 | 187/391 |

FOREIGN PATENT DOCUMENTS

| | | | | |
|---|---|---|---|---|
| JP | 03232680 | A * | 10/1991 | |
| JP | 3083256 | B2 * | 9/2000 | B66B 19/002 |
| JP | 3173912 | B2 * | 6/2001 | B66B 19/002 |

* cited by examiner

APPARATUS FOR ALIGNMENT OF AN ELEVATOR GUIDE RAIL

This application claims priority to European Patent Application No. EP13192859 filed on Nov. 14, 2013, the entire contents of which are incorporated herein by reference.

FIELD

Example embodiments relate to an apparatus for alignment of an elevator guide rail and method thereof.

BACKGROUND

An elevator comprises an elevator car moving in a vertical direction upwards and downwards in an elevator shaft. The elevator car transports people and/or goods between the landings in a building. There are further guide rails being attached to the wall structure of the elevator shaft and extending vertically along the height of the elevator shaft. The car is guided in the lateral direction with gliding means gliding on the guide rails when the car moves up and down in the elevator shaft.

The cross section of the guide rails has normally the form of a letter T. The horizontal branch of the letter T is attached to support brackets being attached to the wall structure of the elevator shaft. The vertical branch of the letter T forms three gliding surfaces for the gliding means. There are thus two opposite side gliding surfaces and one front gliding surface in the guide rail. The gliding means comprises normally a frame part and a gliding part. The horizontal cross-section of the gliding part has the form of a letter U so that the inner surface of the gliding part sets against the three gliding surfaces of the guide rail. The horizontal cross section of the frame part has also a U-shaped section surrounding the gliding part on three sides. The frame part comprises further outwardly extending flanges at the bottom of the letter U for attaching the gliding means to the car sling. There are elasticity means between the gliding part and the frame part in order to isolate the gliding part from the frame part.

The guide rails are formed of rail elements of a certain length. The rail elements are connected in the installation phase end-on-end one after the other in the shaft. It is difficult and time consuming to align the guide rails so that each rail element is in a correct position when the rail element is attached' to the support brackets. The alignment is done by forcing and/or moving the support bracket into a desired position with a hand tool after which the bolts are tightened in order to keep the guide rail in the desired position. The quality of the alignment will vary depending on the mechanic who is doing the alignment.

BRIEF DESCRIPTION OF EXAMPLE EMBODIMENTS

Example embodiments relate to an apparatus for alignment of an, elevator guide rail.

Example embodiments disclose an apparatus for alignment of an elevator guide rail. The apparatus may include: a stationary first part having a first end and an opposite second end and a first longitudinal direction, a movable second part having a first end and an opposite second end and a second longitudinal direction, a link arm mechanism connecting the first part and the second part, said link arm mechanism comprising a first link arm having a first end and an opposite second end and a second link arm having a first end and an opposite second end, whereby: the first end of the first link arm is attached with a first articulated joint to a first support element being movable and retainable with a first actuator in the first direction along the first part of the apparatus and the second end of the first link arm is attached with a fourth articulated joint to a third support element being movable and retainable with a second actuator in the second direction along the second part of the apparatus, the first end of the second link arm is attached with a second articulated joint to a second support element being movable in the first direction along the first part of the apparatus and the second end of the second link arm is attached with a third articulated joint to a third support part, one end of the second part being movably supported on the third support part, a third actuator moving and retaining the second part in relation to the third support part, the first link arm and the second link arm is connected to each other with a fifth articulated joint in a point where the first link arm and the second link arm intersect, the first actuator moves the second part in the first direction, the second actuator moves the second part in a third direction being perpendicular to the first direction, and the third actuator moves the second part in a fourth angular direction around the fourth articulated joint.

Example embodiments relate to a method for aligning an elevator guide rail. The method may include the steps of: fastening the first part of the apparatus to anchoring bolts of a support bracket of the guide rail, fastening the guide rail to the second part of the apparatus, adjusting the guide rail into a desired position with the apparatus, fastening the guide rail to the support bracket, unfastening the guide rail from the second part of the apparatus, unfastening the first part of the apparatus from the anchoring bolts of the support bracket, and removing the apparatus.

In an example embodiment, the apparatus can be used in connection with each support bracket when the guide rail is to be attached to the support bracket. The stationary first part of the apparatus is attached stationary to the anchor bolts of the fastening bracket and the guide rail is attached to the movable second part of the apparatus. The first direction i.e. the direction of the first part coincides with the direction of the wall structure to which the support bracket is attached. The second direction i.e. the direction of the second part is in the initial position parallel with the first direction. The guide rail is then aligned into the correct position by moving the second part of the apparatus with the three actuators. The second part of the apparatus can be moved in three directions which makes it possible to align the guide rail in three directions.

The second part of the apparatus can be moved in a first direction with the first actuator, said first direction being parallel to the plane of the wall structure of the shaft into which wall structure the fastening bracket of the guide rail is to be fastened. The second part of the apparatus can also be moved in a third direction with the second actuator, said third direction being perpendicular to the first direction. The distance between the first part and the second part of the apparatus is changed when the second part is moved in the third direction. The second part can further be moved in a fourth angular direction. This is achieved by moving the second part with the third actuator in relation to the third support part so that the second part turns around the fourth articulated joint. The second direction is in such a situation non-parallel with the first direction.

The apparatus will speed up the process-step of aligning the guide rail compared to prior art methods. The apparatus will also eliminate variations in the quality of the alignment. The quality of the alignment will be less dependent on the person performing the alignment. Every technician can easily make a high quality alignment with the help of the apparatus. Brief description of the drawings The invention will in the following be described in greater detail by means of preferred embodiments with reference to the attached drawings, in which FIG. 1 shows a vertical cross section of an elevator.

Figure 2:
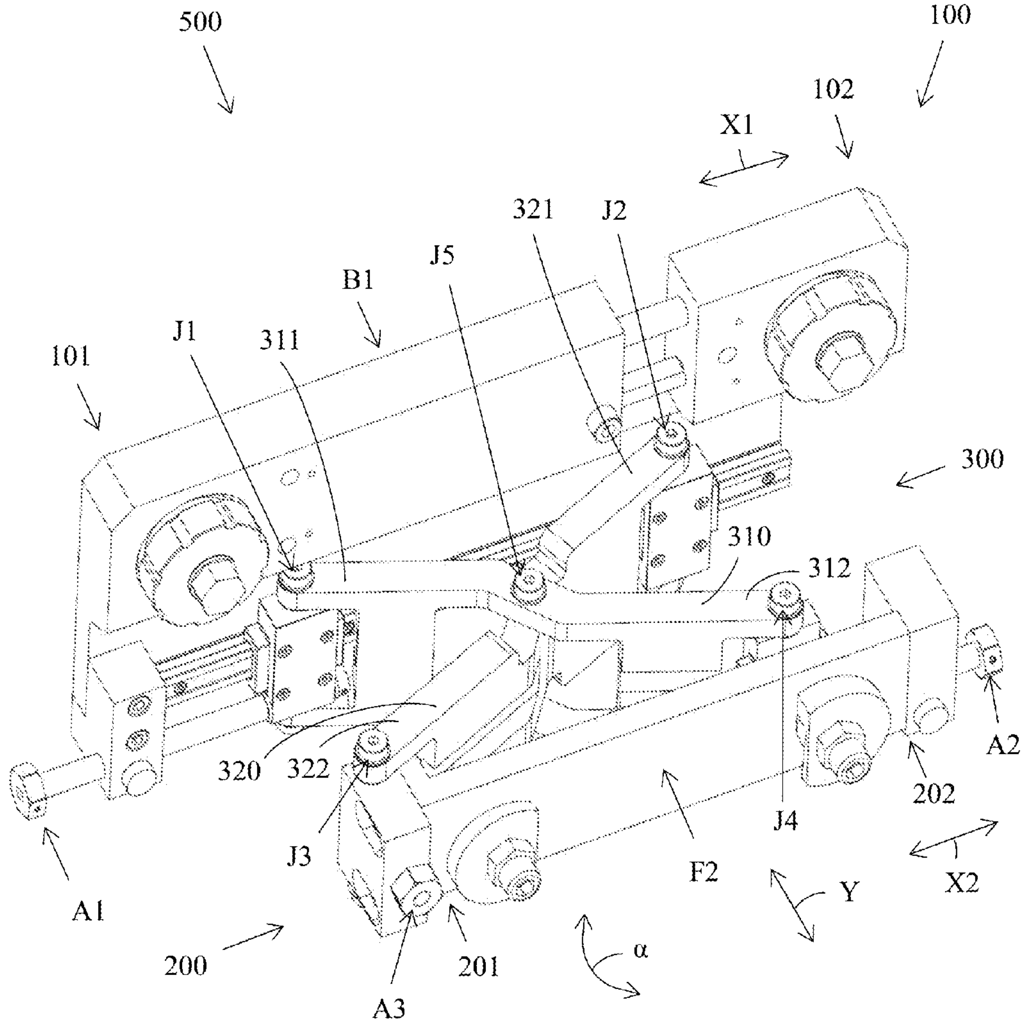
Figure 3:
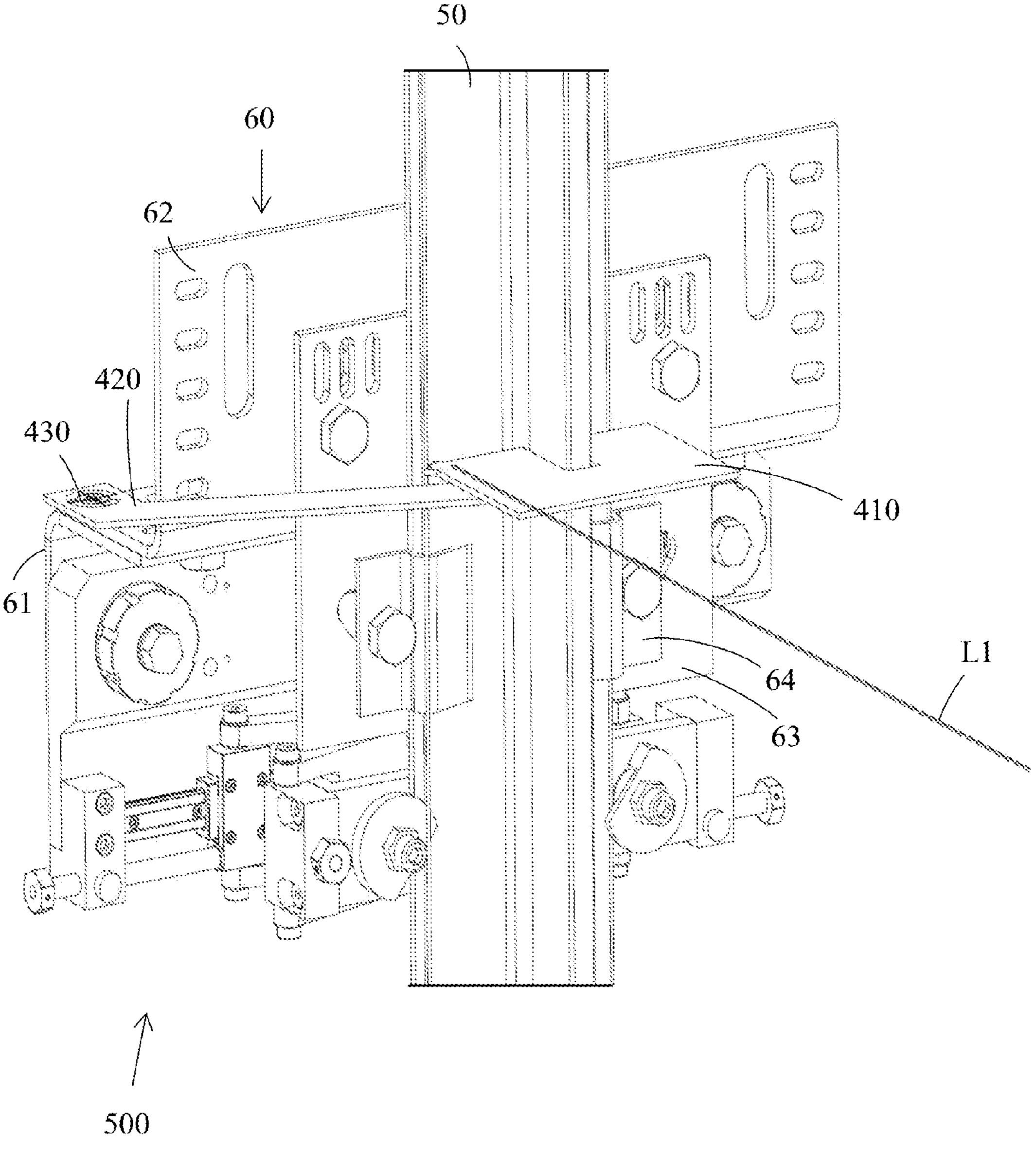
Figure 4:
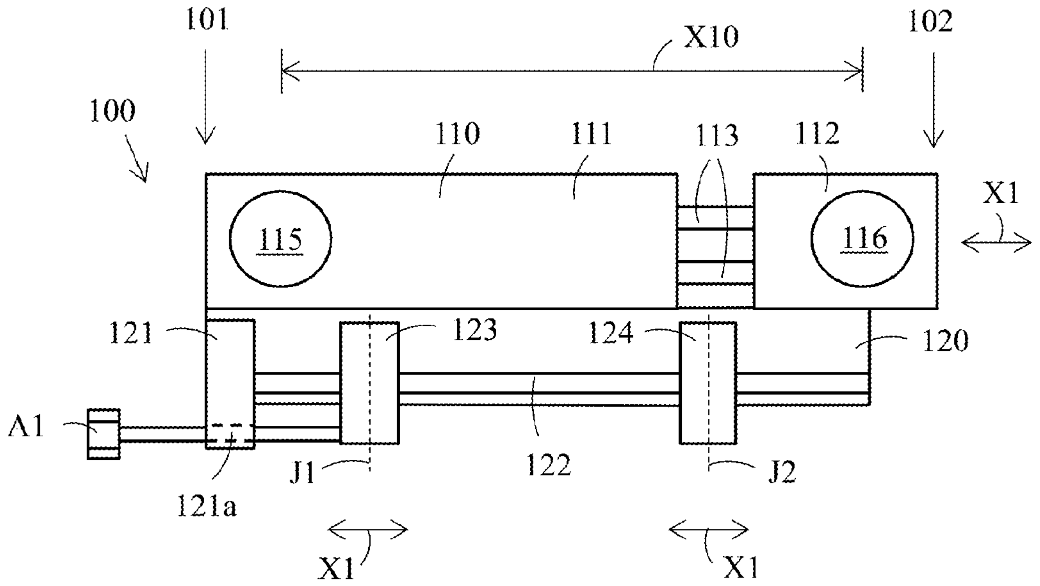
Figure 5:
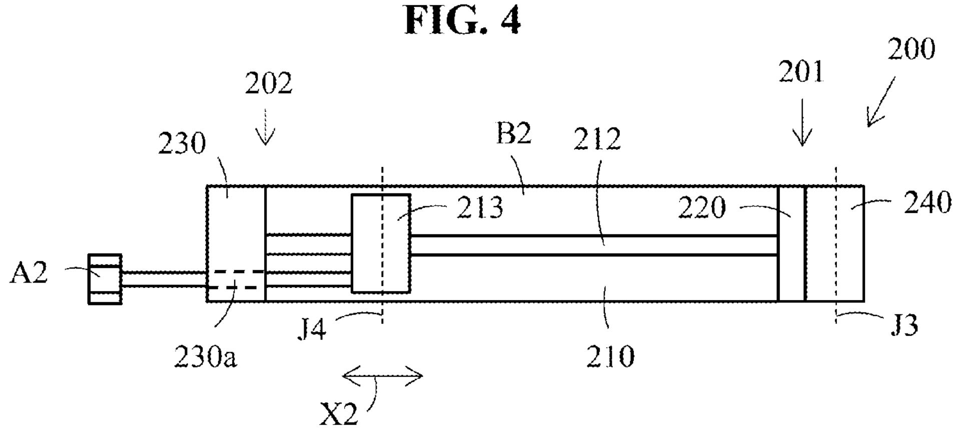
Figure 6:
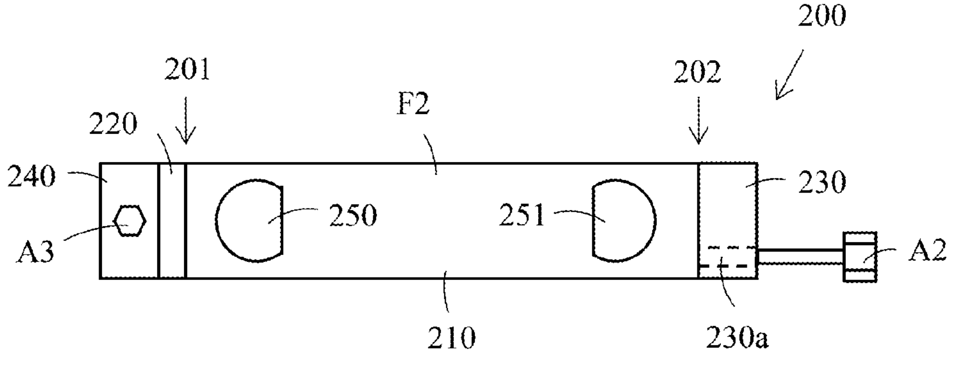
Figure 7A:
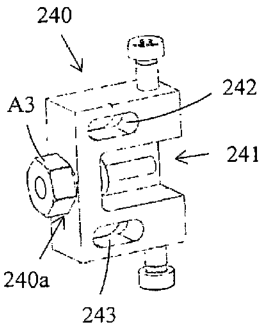
Figure 7B:
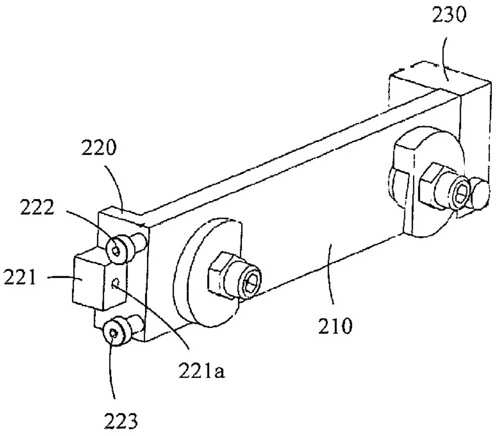

FIG. 2 shows an axonometric view of an apparatus for aligning a guide rail in a shaft according to the invention, FIG. 3 shows the apparatus of FIG. 2 attached to a support bracket of a guide rail, FIG. 4 shows a front view of a first part of the apparatus of FIG. 3, FIG. 5 shows a back view of a second part of the apparatus of FIG. 3, FIG. 6 shows a front view of the second part of the apparatus of FIG. 3, FIGS. 7*a* and 7*b* show a further axonometric view of the second part of the apparatus showing the angular adjustment in more detail.

DETAILED DESCRIPTION OF EXAMPLE EMBODIMENTS

FIG. 1 shows a vertical cross section of an elevator. The elevator comprises a car 10, an elevator shaft 20, a machine room 30, lifting machinery 40, ropes 41, and a counter weight 42. The car 10 is supported on a sling 11 surrounding the car 10. The lifting machinery 40 moves the car 10 in a vertical direction S1 upwards and downwards in the vertically extending elevator shaft 20. The car 10 is carried through the sling 11 by the ropes 41, which connect the car 10 to the counter weight 42. The sling 11 of the car 10 is further supported with gliding means 70 at guide rails 50 extending in the vertical direction in the shaft 20. The figure shows two guide rails 50 at opposite sides of the car 10. The gliding means 70 can comprise rolls rolling on the guide rails 50 or gliding shoes gliding on the guide rails 50 when the car 10 is mowing upwards and downwards in the elevator shaft 20. The guide rails 50 are supported with fastening brackets 60 at the side wall structures 21 of the elevator shaft 20. The figure shows only two fastening brackets 60, but there are several fastening brackets 60 along the height of each guide rail 50. The gliding means 70 engaging with the guide rails 50 keep the car 10 in position in the horizontal plane when the car 10 moves upwards and downwards in the elevator shaft 20. The counter weight 42 is supported in a corresponding way on guide rails supported on the wall structure 21 of the shaft 20. The car 10 transports people and/or goods between the landings in the building. The elevator shaft 20 can be formed so that the wall structure 21 is formed of solid walls or so that the wall structure 21 is formed of an open steel structure.

The guide rails 50 extend vertically along the height of the shaft 20. The guide rails 50 are thus formed of rail elements of a certain length. The rail elements are connected in the installation phase end-on-end one after the other. It is time consuming to install the guide rails 50 so that they are properly aligned along the whole height of the shaft 20. The alignment is in prior art solutions done manually by forcing or moving the support bracket 60 with a hand tool. The quality of the alignment varies depending of the person who is doing the manual alignment. Deviations in the alignment of the guide rail 50 will result in lateral forces acting on the gliding means 70 when the car 10 moves upwards and downwards in the shaft 20. These lateral forces might cause vibrations to the gliding means 70 and thereby also to the car 10. The vibrations acting on the car 10 will also cause noise disturbing the passengers in the car 10.

FIG. 2 shows an axonometric view of an apparatus according to the invention and FIG. 3 shows the apparatus of FIG. 2 attached to a support bracket of a guide. The apparatus 500 for aligning a guide rail 50 in a shaft 20 comprises a first part 100, a second part 200 and a link arm mechanism 300 connecting the first part 100 and the second part 200. The first part 100 of the apparatus 500 can be attached to a support bracket 60 supporting the guide rail 50 on the wall structure 21 of the shaft 20. The guide rail 50 can be attached to the second part 200 of the apparatus 500.

The link arm mechanism 300 comprises a first link arm 310 having a first end and an opposite second end 102 and a second link arm 320 having a first end 321 and an opposite second end 322. The first end 311 of the first link arm 310 is attached with a first articulated joint J1 movably to the first part 100 of the apparatus 500 and the second end 312 of the first link arm 310 is attached with a fourth articulated joint J4 movably to the second part 200 of the apparatus 500. The first end 321 of the second link arm 320 is attached with a second articulated joint J2 movably to the first part 100 of the apparatus 500 and a second opposite end 322 of the second link arm 320 is attached with a third articulated joint J3 to the second part 200 of the apparatus 500. The crosswise running first link arm 310 and second link arm 320 are attached to each other with a fifth articulated joint J5 in the point where the first link arm 310 and the second link arm 320 are crossing each other. Each link arm 310, 320 is formed of two superimposed bars being connected to each other with an intermediate member at both sides of the fifth joint J5.

The first part 100 of the apparatus 500 comprises a first end 101 and an opposite second end 102 as well as a longitudinal first direction X1. The first part 100 is attached to a support bracket 60 so that the back side 61 of the first part 100 sets against the support bracket 60. The support bracket 60 is formed of a first L-shaped part 61 attached to the wall structure 21 of the shaft 20 and a second L-shaped part 62 attached to the first L-shaped part 61. The support bracket 60 comprises further a plate 63 that has been attached to the second L-shaped part 62. The guide rail 50 can be attached with clamps 64 and bolts and nuts to the plate 63. The first L-shaped part 61 and the second L-shaped part 62 are attached to each other with bolts and nuts. The holes for the bolts are longitudinal allowing adjustment of the position between the first and the second L-shaped part 61, 62. The first part 100 of the apparatus 500 is thus a stationary part.

The second part 200 of the apparatus 500 comprises a first end 201 and an opposite second end 202 as well as a second longitudinal direction X2. The second part 200 can be moved with the link arm mechanism 300 in relation to the first part 100. The guide rail 50 is attached to the front side F2 of the second part 200 of the apparatus 500. The second part 200 of the apparatus 500 can be moved in the first direction X1 with a first actuator A1 being formed of a first adjustment screw A1, in a third direction Y with a second actuator A2 being formed of a second adjustment screw A2, and in a fourth angular direction a with a third actuator A3 being formed of a third adjustment screw A3. The first direction X1 runs essentially parallel to the plane of the wall structure 21 onto which the support bracket 60 is fastened in the shaft 20. The third direction Y is perpendicular to the first direction X1. The fourth angular direction a is the angular direction of the second part 200 of the apparatus 500 in relation to the fourth articulated joint J4. The second part 200 can thus be turned with the third adjustment screw A3 so that the first part 100 and the second part 200 are non-parallel i.e. the first direction X1 and the second direction X2 are non-parallel.

FIG. 3 shows also the fairing equipment used in connection with the adjustment of the guide rail 50. The fairing equipment comprises a sheet 410 adapted on the guide rail 50, a support arm 420 with a laser prism 430 and a laser beam L1. The guide rails 50 at opposite side walls 21 of the shaft 20 are faired in the fourth angular direction a with a horizontal laser beam L1 extending from the fairing equipment on one guide rail 50 to the fairing equipment on the opposite guide rail 50. The guide rail 50 is faired in the first direction X1 and the third direction Y with a vertical laser beam passing through the laser prism 430 in the support arm 420.

FIG. 4 shows a front view of a first part of the apparatus of FIG. 3. The first part 100 of the apparatus 500 has an essentially rectangular form and comprises an upper section 110 and a lower section 120. The upper section 110 comprises further a first sub-section 111 and a second sub-section 112 located at the second end 102 of the first part 100. A first quick clamping means 115 is located in the first sub-section 111 and a second quick clamp means 116 is located in the second sub-section 112. The first sub-section 111 is stationary and the second sub-section 112 is movable in the first direction X1. The second sub-section 112 can glide on guide bars 113 in the first direction X1 between an inner position and an outer position. This makes it possible to adjust the distance X10 in the first direction X1 between the quick clamping means 115, 116 of the first part 100. The first part 100 is attached with the quick clamping means 115, 116 to the outer end of the anchor bolts of the support bracket 60. Each quick clamping means 115, 116 can comprise a spherical plain bearing that grip on the outer ends of the anchor bolts. The spherical bearing can be operated with a nut at the front surface of the first part 100. The first part 100 can thus simply be pushed on the support bracket 60 so that the outer ends of the anchor bolts of the support bracket 60 become seated in the spherical plain bearings. The tightening of the first part 100 against the support bracket 60 is then done by turning the nuts at the front surface of the first part 100.

The lower section 120 of the first part 100 comprises a first guide rod 122 extending in the first direction X1. A first 123 support element and a second support element 124 are attached to the first guide rod 122. The first support element 123 and the second support element 124 can glide on the first guide rod 122 in the first direction X1 to the left and to the right in the figure. The first end 311 of the first link arm 310 is attached with the first articulated joint J1 to the first support element 123. The first end 321 of the second link arm 320 is attached with the second articulated joint J2 to the second support element 124.

The lower section 120 of the first part 100 comprises further a first support part 121 that is attached to the lower section 120 at the first end 101 of the first part 100. The first support part 121 is provided with a first hole 121*a* that extends in the first direction X1 through the first support part 121. The first hole 121*a* is provided with an internal threading. The first adjustment screw A1 is provided with an external threading and extends through the first hole 121*a* in the first support part 121. One end of the first adjustment screw A1 is attached to the first support element 123.

Rotation of the first adjustment screw A1 in the first hole 121*a* will thus move the first support element 123 on the first guide rod 122 in the first direction X1 either to the left or to the right in the figure. The first adjustment screw A1 will also retain the first support element 123 in place on the first guide rod 122. The second support element 124 is connected via the second articulated joint J2, the fifth articulated joint J5 in the intersection of the link arms 310, 320 and the first articulated joint J1 to the first support element 123. The second support element 124 will thus follow the movement of the first support element 123 in the first direction X1. The fourth articulated joint (J4) will be stationary. The second part 200 of the apparatus 500 will thus move in synchronism with the first adjustment screw A1 in the first direction X1.

FIG. 5 shows a back view and FIG. 6 shows a front view of the second part of the apparatus of FIG. 3. The second part 200 comprises a first section 210 and a second section 220 at the first end 201 of the second part 200. The second section 220 forms an angle of 90 degrees with the first section 210. The first section 210 and the second section 220 can be formed of a rectangular bar that is bent 90 degrees at one end. A second guide rail 212 extending in the first direction X1 is attached to the first section 210. A third support element 213 is attached to the second guide rail 212. The third support element 213 can glide on the second guide rail 212 in the second direction X2 to the left and to the right in the figure.

A second support part 230 is attached to the second end 202 of the second part 200 so that the second support part 230 forms an angle of 90 degrees with the first section 210 of the second part 200. The second support part 230 is provided with a second hole 230*a* extending in the second direction X2 through the second support part 230. The second hole 230*a* is provided with an internal threading. The second adjustment screw A2 is provided with an external threading and extends through the second hole 230*a* in the second support part 230. One end of the second adjustment screw A2 is attached to the third support element 213. Rotation of the second adjustment screw A2 in the second hole 230*a* will thus move the third support element 213 on the second guide rod 212 in the second direction X2 either to the left or to the right in the figure. The second adjustment screw A2 will also retain the third support element 213 in place on the second guide rod 212.

A third support part 240 is attached to the second section 220 of the second part 200. The third adjustment screw A3 extends in the third direction Y into the third support part 240. The second part 200 will turn around the fourth articulated joint J4 when the third adjustment screw A3 moves the second section 220 in relation to the third support part 240. The third adjustment screw A3 will also retain the second part 200 in place in a given angular position.

The second end 322 of the second link arm 320 is attached with a third articulated joint J3 to the third support part 240. The second end 312 of the first link arm 310 is attached with a fourth articulated joint J4 to the third support element 213.

Rotation of the second adjustment screw A2 will move the second part 200 in the third direction Y in relation to the first stationary part 100. Rotation of the second adjustment screw A2 moves the third support element 213 on the second guide rail 212 in the second direction X2 either to the left or to the right in the figure. The first articulated point J1 will be stationary, the second articulated joint J2 will move in the first direction X1 along the first guide rod 122, the fourth articulated joint J4 and the fifth articulated joint J5 will move along respective circular paths around the centre point i.e. the first articulated joint J1 and the third articulated joint J3 will move in the third direction Y. The second part 200 of the apparatus 500 will thus move in the third direction Y when the second adjustment screw A2 is rotated. Movement of the third support element 213 to the left in FIG. 2 will increase the distance between the second part 200 and the first part 100 in the third direction Y, and vice a versa.

Rotation of the third adjustment screw A3 will move the second section 220 in relation to the third support part 240. The second part 200 will thus turn around the fourth articulated joint J4 when the third adjustment screw A3 is rotated. The third articulated joint J3 will be stationary during the rotation of the third adjustment screw A3. This means that the second part 200 of the apparatus can be turned in the fourth angular direction a around the fourth articulated joint J4 with the third adjustment screw A3. The first direction X1 and the second direction X2 are parallel when the third adjustment screw A3 is in a zero position. The first part 100 and the second part 200 are in such a situation parallel. An angular displacement of the second part 200 from the neutral position will make the second direction X2 non-parallel with the first direction X1.

The second part 200 of the apparatus 500 comprises quick clamping means 250, 251 for fastening the guide rail 50 to the front surface F2 of the second part 200. The quick clamping means 250, 251 can comprise screws and washers. The circular perimeter of the washer forms at a certain sector a straight line as a part of the washer has been cut away. The guide rail 50 can be positioned between the washers against the outer surface F2 of the second part 200. The washers are then rotated so that the edge of the washers set on the guide rail 50.

FIGS. 7*a* and 7*b* show a further axonometric view of the second part of the apparatus showing the angular adjustment in more detail. The second section 220 of the second part 200 comprises a protrusion 221 and two glide members 222, 223. The third support part 240 comprises a first cavity 241 receiving the protrusion 231 of the second section 212 and two oval holes 242, 243 receiving the glide members 222, 223 of the second section 220. The third adjustment screw A3 extends in the third direction Y through a third hole 240*a* into the third support part 240. The internal end of the third adjustment screw A3 comprises an outer threading. The protrusion 221 comprises a fourth threaded hole 221*a* extending in the third direction Y. The third adjustment screw A3 can be screwed into the fourth threaded hole 221*a* in the protrusion 221 when the protrusion 221 is located in the first cavity 241 in the third support part 240. The third adjustment screw A3 is locked in the third direction Y to the third support part 240. The second section 220 of the second part 200 is supported within the third support part 240 through the glide members 222, 223 gliding in the two oval holes 242, 243 in the third support part 240. The second part 200 will turn around the fourth articulated joint J4 when the third adjustment screw A3 moves the protrusion 221 in the cavity 241. The third adjustment screw A3 will also retain the second part 200 in place in a given angular a position.

The guide rail 50 is first adjusted into the correct position with the apparatus 500 after which the guide rail 50 is fastened to the support bracket 60. The adjustment possibilities in the support bracket 60 are used so that the guide rail 50 becomes attached to the support bracket 60 exactly in the position determined by the apparatus 500. The apparatus 500 is then released and moved to the next fastening point.

The arrangement could naturally also be reversed so that the first adjustment screw A1 would be located at the second end 102 of the first part 100, whereby the first adjustment screw A1 would act on the second support element 124. Also the arrangement in the second part 200 would then have to be reversed so that the first end 201 of the second part 200 would be at the right in FIG. 2 and the second end 202 of the second part 200 would be at the left in FIG. 2. The fourth articulated joint J4 would be attached to the stationary third support part 240 and the third articulated joint J3 would be attached to the movable third support element 213.

The support elements 123, 124, 213 are in the figures gliding on the guide rods 122, 212. The arrangement could naturally also be such that the support elements 123, 124, 213 roll instead of glide on the guide rods 122, 212.

The adjustment of the second part 200 in relation to the first part 100 is in the embodiment shown in the figures done manually with actuators in the form of adjustment screws A1, A2, A3. The adjustment could naturally be done automatically. The adjustment screws A1, A2, A3 could be replaced with other kind of actuators in the form of e.g. electric motors or hydraulic or pneumatic cylinder-piston apparatuses. These other kind of actuators would then be used to move the first support element 123, the third support element 213 and the movable part in the stationary third support part 240.

The third adjustment screw A3 is in the embodiment shown in the figures extending into the third support part 240 and acts on the protrusion 221 of the second section 220 of the second part 200 within the third support part 240. This is a compact and advantageous arrangement, but this could be done in varies other ways. The essential aspect is to have the second part 200 movably supported on the third support part 230 and to use a third actuator A3 moving the second part 200 in a fourth angular direction a around the fourth articulated joint J4. The third actuator A3 could be positioned on the third support part 240 or on the second part 200.

The first adjustment screw A1 and the second adjustment screw A2 could further be provided with quick releasing means in the first support part 121 and the second support part 230. The quick releasing means would unlock and lock the screws to the threads 121*a*, 230*a* in the support parts 121, 230. This would make it faster to adjust the second part 200 into approximately the right position before starting the actual alignment of the guide rail 50.

The first part 100 comprises in the embodiment shown in the figures an upper section 110 and a lower section 120. The upper section 110 comprises further a stationary first subsection 111 and a movable second sub-section 112 gliding on guide bars 13 in the first direction X1 between an inner position and an outer position. The upper section 110 could instead be formed of a single part. There adjustment of the distance X10 between the quick clamping means 115, 116 could be achieved by arranging a longitudinal hole in connection with at least one of the quick clamping means 115, 116.

The upper section 110 and the lower section 120 in the first part 100 could be formed of separate parts or of a single part.

The use of the invention is naturally not limited to the type of elevator disclosed in FIG. 1, but the invention can be used in any type of elevator e.g. also in elevators lacking a machine room and/or a counterweight.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus for alignment of an elevator guide rail, comprising:

a stationary first part having a first end and an opposite second end in a first longitudinal direction;

a movable second part having a first end and an opposite second end in a second longitudinal direction; and a link arm mechanism connecting the stationary first part and the movable second part, said link arm mechanism including a first link arm having a first end and an opposite second end and a second link arm having a first end and an opposite second end, wherein:

the first end of the first link arm is attached with a first articulated joint to a first support element being movable and retainable by a first actuator in the first longitudinal direction along the first part of the apparatus and the second end of the first link arm is attached with a fourth articulated joint to a third support element being movable and retainable by a second actuator in the second longitudinal direction along the movable second part of the apparatus, the first end of the second link arm is attached with a second articulated joint to a second support element being movable in the first longitudinal direction along the first part of the apparatus and the second end of the second link arm is attached with a third articulated joint to a third support element, the first end of the movable second part being movably supported on the third support element, a third actuator moving and retaining the movable second part in relation to the third support element, the first link arm and the second link arm are connected to each other with a fifth articulated joint at a point where the first link arm and the second link arm intersect, the first actuator is configured to move the second part in the first direction, the second actuator is configured to move the movable second part in a third direction, in which the third direction is perpendicular to the first longitudinal direction, and the third actuator is configured to move the movable second part in an angular direction around the fourth articulated joint.

2. The apparatus according to claim 1, wherein the stationary first part is attached to a support bracket supporting the elevator guide rail on a wall structure of an elevator shaft and that the guide rail is attached to a front side of the movable second part.

3. The apparatus according to claim 2, wherein the stationary first part of the apparatus comprises a first clamping device and a second clamping device for attaching the stationary first part to anchor bolts of the support bracket.

4. The apparatus according to claim 2, wherein the movable second part of the apparatus comprises a third clamping device and a fourth clamping device for attaching the guide rail to the front side of the movable second part.

5. The apparatus according to claim 1, wherein a first guide rod extending in the first longitudinal direction is attached to the stationary first part, wherein the first support element and the second support element are attached to the first guide rod so that the first support element and the second support element are configured to glide along the first guide rod.

6. The apparatus according to claim 1, wherein a second guide rod extending in the second longitudinal direction is attached to the movable second part, wherein the third support element is attached to the second guide rod so that the third support element is configured to glide along the second guide rod.

7. The apparatus according to claim 1, wherein the first actuator is formed of a screw extending in the first longitudinal direction through a first threaded hole in the first support element, and wherein one end of the first adjustment screw is attached to the first support element so that the first support element is configured to move in the first longitudinal direction when the first adjustment screw is turned in the first threaded hole.

8. The apparatus according to claim 1, wherein the second actuator is formed of a second adjustment screw extending in the second longitudinal direction through a second threaded hole in the second support element, and wherein one end of the second adjustment screw is attached to the third support element so that the third support element is configured to move in the second longitudinal direction when the second adjustment screw is turned in the second threaded hole.

9. The apparatus according to claim 1, wherein the third actuator is formed of a third adjustment screw extending in a third direction through a hole into a cavity in the third support element, the cavity receiving a protrusion that is attached to the first end of the movable second part, wherein an inner end of the third adjustment screw is configured to pass into the third threaded hole so that the movable second part is configured to move in an angular direction around the fourth articulated joint when the third adjustment screw is turned in the third threaded hole.

10. The apparatus according to claim 1, wherein the stationary first part comprises an upper section and a lower section, the upper section further includes a stationary first sub-section and a movable second sub-section gliding on guide bars in the first longitudinal direction between an inner position and an outer position, wherein a distance in the first longitudinal direction between the first clamping device located in the first sub-section and a second clamping device located in the second sub-section is adjustable.

11. A method for aligning an elevator guide rail, the method comprising:

fastening the stationary first part of the apparatus according to claim 1 to anchoring bolts of a support bracket of the guide rail, fastening the guide rail to the movable second part of the apparatus, adjusting the guide rail into a desired position with the apparatus, fastening the guide rail to the support bracket, unfastening the guide rail from the movable second part of the apparatus, unfastening the first part of the apparatus from the anchoring bolts of the support bracket, and removing the apparatus.

* * * * *